United States Patent [19]

Hoshino

[11] Patent Number: 4,623,927
[45] Date of Patent: Nov. 18, 1986

[54] SOLID STATE IMAGE PICKUP APPARATUS

[75] Inventor: Kunihisa Hoshino, Urawa, Japan

[73] Assignee: Nippon Kogaku K. K., Tokyo, Japan

[21] Appl. No.: 756,641

[22] Filed: Jul. 19, 1985

[30] Foreign Application Priority Data

Jul. 27, 1984 [JP] Japan .................................. 59-156970

[51] Int. Cl.$^4$ ................................................ H04N 3/14
[52] U.S. Cl. .................................................... 358/213
[58] Field of Search ......................... 358/213, 212, 209

[56] References Cited

U.S. PATENT DOCUMENTS 4,153,915  5/1979  McKechnie ........................ 358/213
4,159,488  6/1979  Tanaka et al. ...................... 358/213

FOREIGN PATENT DOCUMENTS 154880  11/1981  Japan .

Primary Examiner—Gene Z. Rubinson
Assistant Examiner—Stephen Brinich
Attorney, Agent, or Firm—Shapiro and Shapiro

[57] ABSTRACT

A solid state image pickup apparatus can obtain a constant photoelectric transfer output even if an incident light intensity is very high, so that a signal processing circuit to be connected to an output of the apparatus can be simplified in configuration and only low voltage and low power are required. In the apparatus, an incident light intensity on a photoelectric transfer surface is detected, and a charge stored time is decreased in accordance with an increase in the incident light intensity. When the incident light intensity falls within a normal range, the transfer gate clock pulse is controlled to have a predetermined pulse width so as to allow transfer of the photoelectric transfer charge to the CCD shift register. Thus, a substantially constant photoelectric transfer output can be obtained. When the incident light intensity is high, the pulse width of the transfer gate clock is decreased. When the transfer gate clock pulse is controlled to have a short pulse width in this manner, a substantially constant photoelectric transfer output can be obtained irrespective of the incident light intensity.

10 Claims, 10 Drawing Figures

SOLID STATE IMAGE PICKUP APPARATUS

BACKGROUND OF THE INVENTION

1. Field of the Invention

The present invention relates to a solid state image pickup apparatus for controlling a charge stored time of a solid state image pickup element in accordance with an incident light intensity.

2. Description of the Prior Art

A technique as disclosed in Japanese Patent Disclosure No. 154880/1981 is known as a method of controlling a charge stored time of a solid image pickup element in accordance with an incident light intensity in order to enlarge the dynamic range of the element.

In this technique, a charge stored time T is controlled in inverse proportion to a mean value L of incident light intensity, as shown in FIG. 1, so that a mean value V of a constant photoelectric transfer output can be always obtained irrespective of the incident light intensity, as shown in FIG. 2. Therefore, the dynamic range of photoelectric transfer is widened, and the configuration of a signal processing circuit can be simplified. For example, when the signal processing circuit performs A/D conversion of a photoelectric transfer output to obtain a digital signal, the level of the photoelectric transfer output must be matched with the input range of the A/D converter. This conventional technique is particularly effective in this respect.

However, when a control unit of this type is assembled in a focusing detection apparatus used in a camera of various type, the incident light intensity, i.e., the brightness of an object to be photographed changes within a very wide range, and the output level cannot be kept constant over such a very wide range of incident light intensity.

As an example, when the incident light intensity is very low, a charge stored time Ts is prolonged, so that the S/N ratio is degraded by a dark current or the like and the response characteristic of the focus detection system is also degraded. For this reason, in order to improve sensitivity, a photoelectric transfer surface of relatively large area is required, and the charge stored time Ts has an upper limit of at best 200 msec.

On the other hand, when the incident light intensity is high, for example, $2^{15}$ times that of the small incident light intensity, the exposure time becomes about $Ts = 200/2^{15} \approx 6$ $\mu$sec.

In practice, as shown in FIG. 3, it takes a certain period of time (the larger the area of the photoelectric transfer surface and charge storage section, the longer the transfer time; i.e., several microseconds to several tens of microseconds) for a photoelectric transfer charge to be completely transferred to a CCD shift register. For this reason, the charge generated in the photoelectric transfer surface exposed during such a certain period of time is also transferred to the CCD shift register, thereby causing an exposure error. Then, the photoelectric transfer output increases as indicated by the broken line shown in FIG. 2, so that an output is not suitable for input to the signal processing circuit. This has limited the dynamic range.

SUMMARY OF THE INVENTION

It is therefore an object of the present invention to provide a solid state image pickup apparatus which can obtain a constant photoelectric transfer output even if an incident light intensity is very high, so that a signal processing circuit to be connected to an output of the apparatus can be simplified in configuration and only low voltage and low power are required.

In order to achieve the above object, basically, an incident light intensity on a photoelectric transfer surface is detected, and a charge stored time is decreased in accordance with an increase in the incident light intensity. When the incident light intensity falls within a normal range, the transfer gate clock pulse is controlled to have a predetermined pulse width so as to allow transfer of the photoelectric transfer charge to the CCD shift register. Thus, a substantially constant photoelectric transfer output can be obtained. When the incident light intensity is high, the pulse width of the transfer gate clock is decreased. When the transfer gate clock pulse is controlled to have a short pulse width in this manner, a substantially constant photoelectric transfer output can be obtained irrespective of the incident light intensity.

According to the apparatus of the present invention, an output saturation does not occur even if the object brightness is high, and the signal processing circuit need only low power.

BRIEF DESCRIPTION OF THE DRAWINGS

FIG. 10 is a flow chart of a sequence when the present invention is performed by program control by a microcomputer or the like.

DESCRIPTION OF THE PREFERRED EMBODIMENTS

Figure 4:
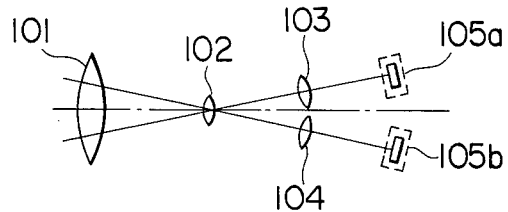
FIG. 4 is a diagram showing an optical system in a focusing detection system in which a solid state image pickup apparatus of the present invention is applied.

Referring to FIG. 4, an optical system of a focus detection system to which the present invention is applicable has an imaging lens 101, a field lens 102 arranged at a position equivalent to a film surface, and reimaging lenses 103 and 104. Solid state image pickup elements 105a and 105b are at conjugate positions with the field lens 102.

Optical images of an object are formed on the elements 105a and 105b by a pair of light rays which have passed through different pupil regions of the imaging lens 101. When the imaging lens 101 is in focus, the images on the elements 105a and 105b coincide with each other. However, when the imaging lens 101 is out of focus, the images are shifted relative to each other. Thus, the relative displacement between the images on the elements 105a and 105b represents the focusing state of the lens 101.

Figure 5:
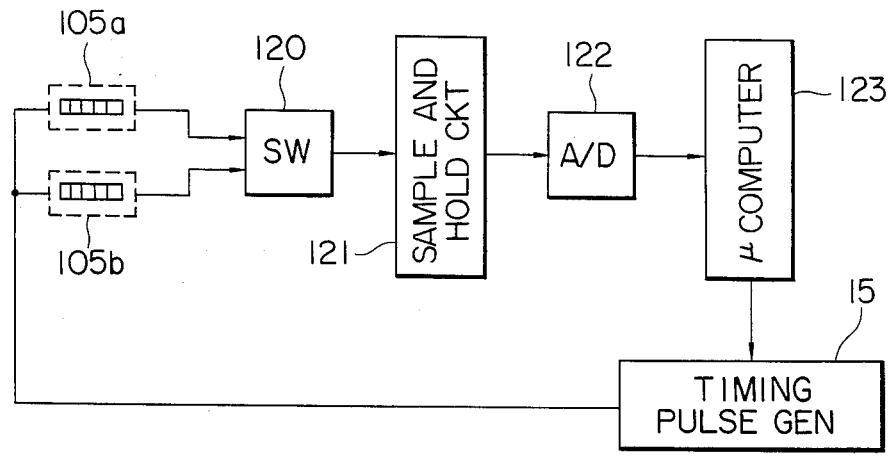
FIG. 5 is a schematic block diagram of a focusing detection apparatus using the optical system shown in FIG. 4.

Referring to FIG. 5, a switching circuit 120 selects one of the photoelectric transfer outputs from the pair of solid state image pickup elements 105a and 105b. A sample and hold circuit 121 is connected to the output of the switching circuit 120, and an A/D converter 122 is connected to the output of the sample and hold circuit 121. A signal output from the A/D converter 122 is supplied to a microcomputer 123. The microcomputer 123 calculates a relative displacement between the images of the elements 105a and 105b and performs focusing detecting processing. A timing pulse generator 15 generates various timing pulses for driving the elements 105a and 105b.

Figure 6:
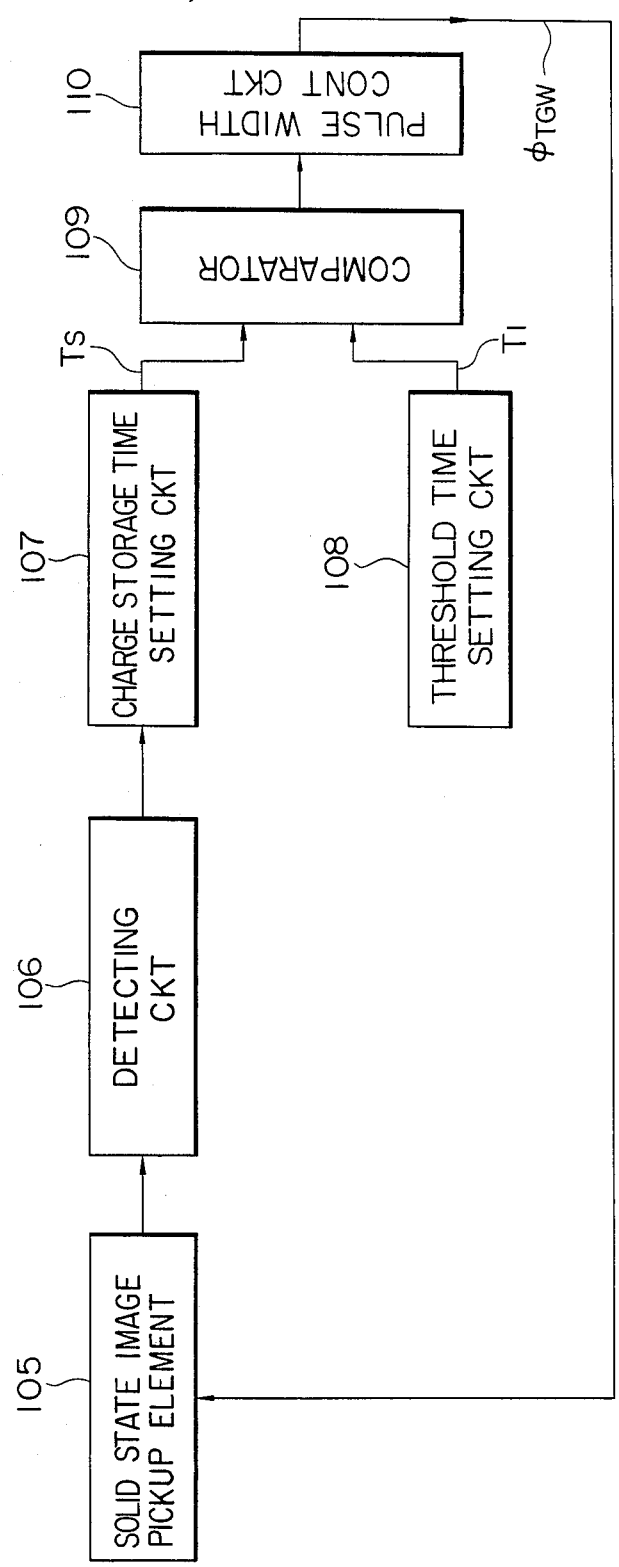
FIG. 6 is a block diagram showing the basic configuration according to the present invention.

A basic configuration according to the present invention shown in FIG. 6 has a solid state image pickup element 105 comprising a photoelectric transfer section of charge storage type, e.g., a CCD. Although two solid image pickup elements are shown in FIG. 5, only one element is shown in FIG. 6. A detecting circuit 106 detects an intensity of light incident on the element 105. More specifically, the detecting circuit 106 detects the level of a time serial output signal from the element 105. A charge stored time setting circuit 107 sets charge stored time of the element 105 in accordance with the detection level from the detecting circuit 106. Thus, the setting circuit 107 sets charge stored time Ts so as to obtain a suitable time serial signal level by photoelectric transfer from the solid image pickup element 105 even if the intensity of light incident on the element 105 drifts. For example, as shown in FIG. 5, when a photoelectric transfer output is A/D converted, the charge stored time Ts is controlled so that the photoelectric transfer output matches with the input range of the A/D converter. It is preferable that the mean value of the photoelectric transfer outputs takes an intermediate value within the input range of the A/D converter.

Figure 2:
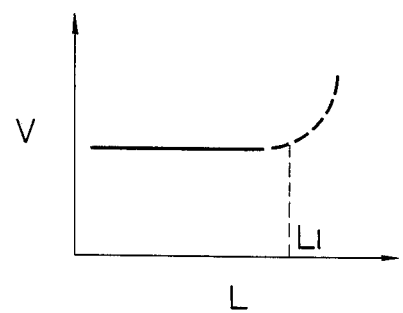
FIG. 2 is a graph showing the photoelectric transfer output as a function of the incident light intensity in a conventional apparatus.

A threshold time setting circuit 108 sets as a threshold time an allowable limit time T1 over which a suitable photoelectric transfer output cannot be obtained with a normal charge stored time Ts by the charge stored time setting circuit 107 and an exposure error is caused. As described earlier, it takes a certain period of time before a charge subjected to photoelectric transfer at the solid state image pickup element 105 is completely transferred to the CCD shift register. Therefore, when the object brightness is very high, the charge amount (to be referred to as an exposure error) generated in the photoelectric transfer surface exposed within a time period of this transfer operation becomes nonnegligible as compared to the previous charge amount. Such a nonnegligible charge amount is also transferred to the CCD shift register. For this reason, as indicated by the broken line in FIG. 2, even if the charge stored time is limited within a high incident light intensity L range, the photoelectric transfer output increases and becomes unsuitable for input to a signal processing circuit, e.g., an A/D converter. In view of this, the threshold time setting circuit 108 sets as the threshold time T1 an allowable time limit of the charge stored time corresponding to a maximum allowable incident light intensity L1 at which an exposure error may not occur and adversely affect the signal processing circuit.

A comparator 109 compares the charge stored time Ts set by the time settint circuit 107 in accordance with the incident light intensity, with the predetermined charge stored time T1 set by the time setting circuit 108. A pulse width control circuit 110 controls the pulse width of a transfer gate clock pulse for driving a transfer gate (which controls charge transfer from the charge storage section to be described in the element 105 to the CCD shift register) in accordance with the comparison output from the comparator 109. More specifically, when Ts>T1, e.g., the object brightness is lower than a normal level, since the exposure error is negligibly small, the pulse width of a transfer gate clock pulse $\phi$TGW is set at a predetermined value. However, when Ts≦T1, i.e., when the object brightness is very high and the exposure error is not negligible, in order to correct this exposure error, the pulse width of the transfer gate clock pulse $\phi$TGW is decreased in accordance with the charge stored time Ts (corresponding to the incident light intensity).

Figure 7:
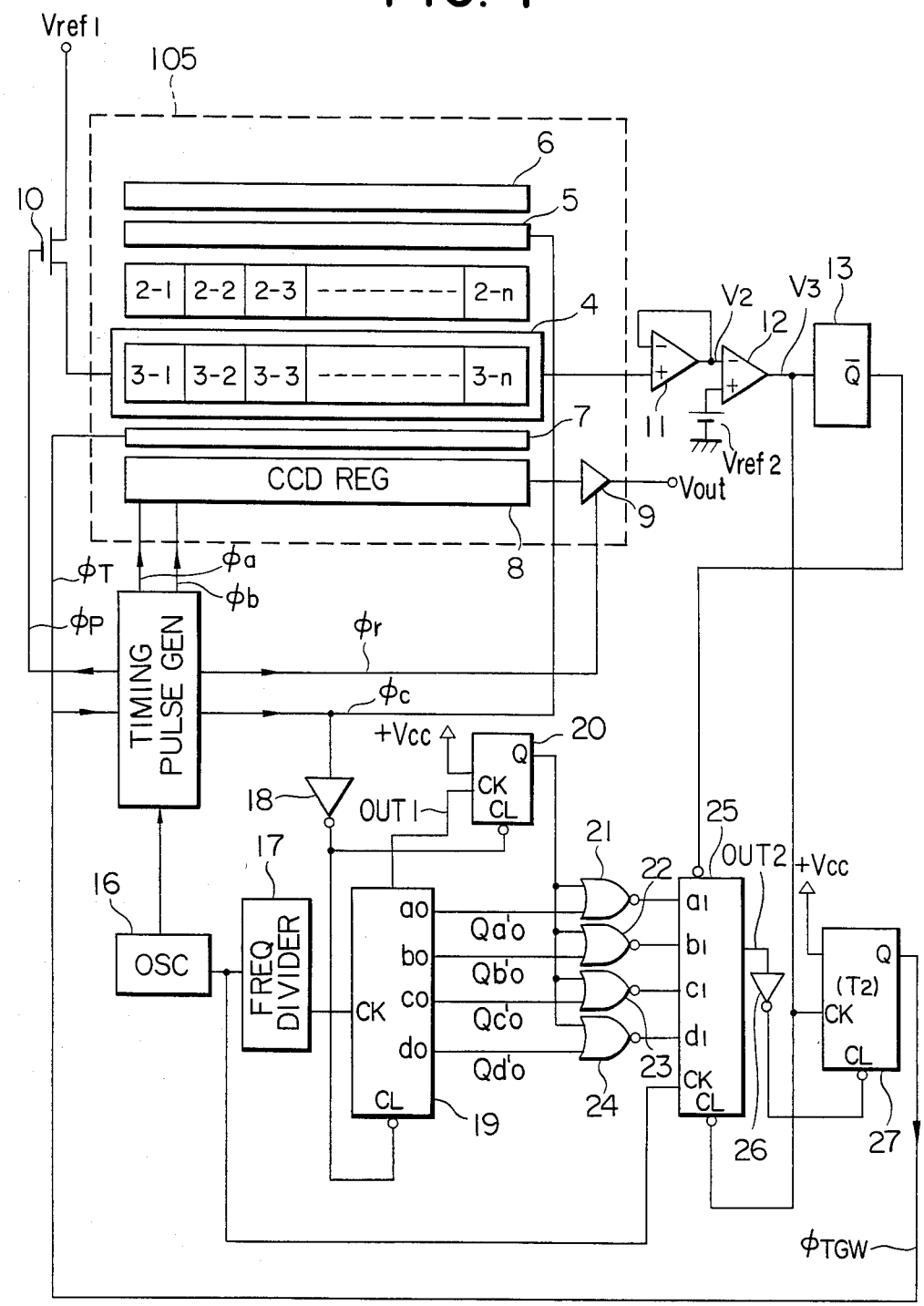
FIG. 7 is a circuit block diagram of hardware of an apparatus according to an embodiment of the present invention.

Referring to FIG. 7 showing the hardware block diagram according to the present invention, the solid state image pickup element 105 comprises charge storage sections 3-1 to 3-n for storing charges generated in n photoelectric transfer surfaces 2-1 to 2-n (photodiodes or the like), a CCD shift register 8 for producing the stored charges as a time-serial photoelectric transfer signal, a transfer gate 7 for performing charger transfer to the CCD shift register 8, an output amplifier (floating diffusion amplifier) 9 for converting the transferred charge into a voltage signal, an overflow drain 6 for discharging an unnecessary charge, and a clear gate 5 for controlling charge flow to the overflow drain 6.

A common storage electrode 4 is arranged for the charge storage sections 3-1 to 3-n of the element 105 and receives a suitable bias voltage Vref1 through a MOS transistor 10. The charge storage sections 3-1 to 3-n and the electrode 4 overlap each other within the X-Y coordinate system but are located at different positions within the X-Y-Z coordinate system. A follower amplifier 11 for detecting the potential at the electrode 4 is connected thereto. An output V2 from the follower amplifier 11 changes in proportion to the charge stored amount (exposure amount). The MOS transistor 10 for supplying the bias voltage Vref1 and the follower amplifier 11 together constitute a detecting circuit 106 for detecting the incident light intensity as shown in FIG. 6.

The output V2 from the follower amplifier 11 is supplied to the inverting input terminal of the comparator 12, the non-inverting input terminal of which receives a reference voltage Vref2. An output V3 from the comparator 12 is supplied to a one-shot multivibrator 13, a clear terminal CL of a ripple carry counter 25, and a clock terminal CK of a D flip-flop (to be referred to as D-FF hereinafter) 27. When time required for inverting the output V3 from the comparator 12 is detected, the intensity of incident light can be detected. The charge stored time Ts is set so that the mean value of the photoelectric transfer outputs takes an intermediate value within the input range of the A/D converter when the reference voltage Vref2 is properly set. The $\overline{Q}$ output of the one-shot multivibrator 13 is connected to the load terminal of the ripple carry counter 25.

A timing pulse generating circuit 15 generates a clear pulse $\phi$c for enabling/disabling the clear gate 5, a preset pulse $\phi$p for enabling/disabling the MOS transistor 10, two phase transfer clock pulses φa and φb for driving the CCD shift register 8, and a reset pulse φr for resetting the output amplifier 9. An output from an oscillator 16 is supplied to a frequency divider 17 having a predetermined frequency dividing ratio and to the clock terminal CK of the ripple carry counter 25. An output from the frequency divider 17 is supplied to the clock terminal CK of a ripple carry counter 19. The counter 19 generates a ripple carry output OUT1 upon counting the number of pulses corresponding to the time T1. The ripple carry output OUT1 of the ripple carry counter 19 is supplied to the clock terminal of a D-FF 20. The inverted output of the pulse φc is commonly supplied through an inverter 18 to the clear terminals CL of the ripple carry counter 19 and the D-FF 20. When the pulse φc is at high level (to be referred to as H level hereinafter), i.e., when the clear gate 5 is enabled and no charge is stored on the charge storage sections 3-1 to 3-n, the ripple carry counters 19 and the D-FF 20 are cleared. The Q output from the D-FF 20 is commonly supplied to one input terminal of each of NOR gates 21 to 24, and the D input terminal of the D-FF 20 is connected to +Vcc to be fixed at H level.

The other input terminal of each of the NOR gates 21 to 24 is connected to one of binary outputs a0 to d0 of the ripple carry counter 19. The outputs of the NOR gates 21 to 24 are respectively connected to preset input terminals a1 to d1 of the ripple carry counter 25.

Figure 3:
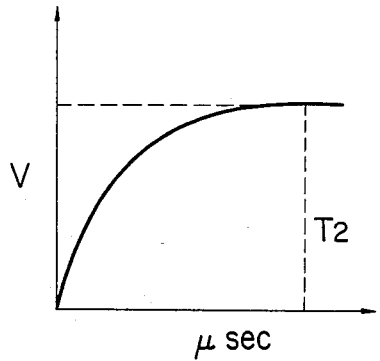
FIG. 3 is a graph showing the photoelectric transfer output as a function of the pulse width of a transfer gate clock pulse.

The ripple carry counter 25 generates a ripple carry output OUT2 upon counting the number of clock pulses corresponding a difference obtained by subtracting the number of pulses preset through the preset terminals a1 to d1 from the number of pulses corresponding to time T2 (FIG. 3). The ripple carry output OUT2 is connected to the clear terminal of the D-FF 27 through an inverter 26. Since the maximum pulse numbers countable by the counters 19 and 25 are set to be equal to each other, the ratio of the times T1 to T2 becomes equal to the frequency dividing ratio of the frequency divider 17. The Q output of the D-FF 27 is applied to the transfer gate 7 as the transfer gate clock pulse φTWG and to a timing pulse generating circuit 15. The timing pulse generating circuit 15 sets the pulse φc at H level after a predetermined period of time since the leading edge of the pulse φTWG. With the above circuit configuration, the oscillator 16, the frequency divider 17, the inverter 18, and the ripple carry counter 19 correspond to the threshold time setting circuit 108 shown in FIG. 6, and set the time T1 as the allowable limit time of the exposure error which corresponds to the time period from the time at which the pulse φc goes to low level (to be referred to as L level hereinafter) to the time at which the output from the ripple carry counter 19 goes to H level. The D-FF 20 corresponds to the comparator 109 shown in FIG. 6, and the oscillator 16, the frequency divider 17, the inverter 18, the ripple carry counter 19, the NOR gates 21 to 24, the ripple carry counter 25, the inverter 26, and the D-FF 27 correspond to the pulse width control circuit 110 shown in FIG. 6. With this hardware arrangement, when the intensity of light incident on the photoelectric transfer surfaces 2-1 to 2-n falls within a normal range, the charge stored time Ts of the photoelectric transfer surfaces 2-1 to 2-n is controlled in accordance with the incident light intensity. Thus, a constant photoelectric transfer output Vout is obtained irrespective of the incident light intensity. When the incident light intensity is very high and the enable time of the transfer gate 7 is non-negligible, the enable period of the transfer gate 7 which is determined by the pulse width of the transfer gate clock pulse φTGW in accordance with the incident light intensity is decreased. Thus, a substantially constant photoelectric transfer output is obtained even if the object brightness is very high.

Figure 8:
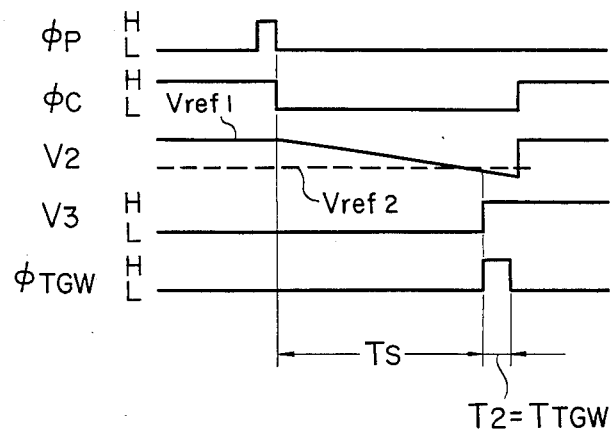
FIG. 8 is a timing chart showing the mode of operation of the embodiment shown in FIG. 7 within a normal incident light intensity range.

The timing chart shown in FIG. 8 corresponds to the case wherein the intensity of light incident on the photoelectric transfer surfaces 2-1 to 2-n of the solid state image pickup element is not very high, i.e., when Ts<T1 and the time in which the transfer gate is enabled by the transfer gate pulse φTWG is negligible. In this case, the charge stored time Ts is controlled so that a constant photoelectric transfer output is obtained.

Referring to FIG. 8, before charge storage operation, the clear pulse φc of H level is applied to the clear gate 5, and the unnecessary charges on the photoelectric transfer surfaces 2-1 to 2-n are discharged to the overflow drain 6. When the timing pulse generating circuit 15 applies a preset pulse φp of H level to the gate of the MOS transistor 10 in order to start charge storage, the bias voltage Vref1 is applied to the electrode 4 so as to allow charge storage.

The clear pulse φc is set at L level in synchronism with the trailing edge of the preset pulse φp. The clear gate 5 is disabled, and charge storage, i.e., exposure is started. At the same time, the clear states of the ripple carry counter 19 and D-FF 20 are released by the L level output from the inverter 18, and the ripple carry counter 19 starts counting the frequency-divided pulses from the frequency divider 17.

The output V2 from the follower amplifier 11 connected to the electrode 4 in the floating state decreases in proportion to the total amount of charges stored below the electrode 4, i.e., the integrated value of the photoelectric transfer outputs. Therefore, when charge storage is stopped upon detecting that the output V2 from the follower amplifier 11 has reached a predetermined value, a photoelectric transfer output VOUT of a predetermined level can be obtained. The reference voltage Vref2 is set at this predetermined level. When the output V2 from the follower amplifier 11 reaches the reference voltage Vref2, the output V3 from the comparator 12 goes to H level. At the same time, the Q output from the D-FF 27, i.e., the transfer gate pulse φTWG goes to H level, and transfer of the charges stored below the electrode 4 to the CDD shift register 8 is started.

Since the intensity of the light incident on the photolectric transfer surfaces 2-1 to 2-n is such that the exposure error is negligible, the charge stored time Ts in this case holds relation Ts>TTGW where the time TTGW is determined by the pulse width of the transfer gate clock pulse φTGW for enabling the transfer gate 7. Thus, the time in which the ripple carry output OUT1 from the ripple carry counter 19 is at H level is the time T1 determining the allowable limit for the exposure error and holds relation Ts>T1 >TTGW. When the charge stored time Ts reaches T1, the Q output from the D-FF 20 goes to H level, and an H level input is applied to one input terminal of each of the NOR gates 21 to 24. Therefore, the outputs from the NOR gates 21 to 24 all go to L level. When the output from the comparator 12 goes to H level after the exposure time Ts, the 0 preset values are read by the ripple carry counter 25 through the input terminals a1 to d1 by the load pulse from the one-shot multivibrator 13. The count time T2 from the 0 preset value to a predetermined count from the time at which the output V3 from the comparator 12 goes to H level and charge transfer is started to the time at which the ripple carry output OUT2 from the ripple carry counter 25 goes to H level is uniquely determined by the clock frequency of the oscillator 16. After the time T2, the output OUT2 from the ripple carry counter 25 goes to H level, the D-FF 27 is cleared through the inverter 26, the output from the D-FF 27 goes to L level, the supply of the transfer gate clock pulse φTGW is stopped, and transfer of the stored charges to the CCD shift register 8 is completed.

As shown in FIG. 8, the time T2 from the time at which the 0 preset value is read by the ripple carry counter 25 to the time at which the ripple carry output is obtained is the time which allows complete transfer of the charges under the electrode 4 to the CCD shift register 8 and holds relation T1>T2=TTGW.

Figure 1:
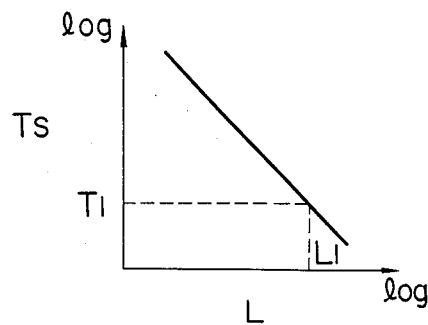
FIG. 1 is a graph showing the charge stored time as a function of incident light intensity in a conventional apparatus.

The mode of operation when the incident light intensity is high will be described with reference to the timing chart shown in FIG. 9. When the incident light intensity is very high, the charge stored time Ts set in accordance with the characteristics shown in FIG. 1 holds relation Ts<T1 where T1 is the allowable limit time for the exposure error. The time Ts holds relation Ts≈TTGW where TTGW is the pulse width of the transfer gate clock pulse φTTGW within a normal incident light intensity range.

Figure 9:
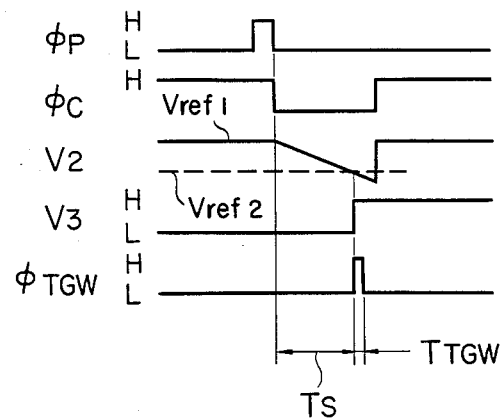
FIG. 9 is a timing chart showing the mode of operation of the embodiment shown in FIG. 7 when the incident light intensity is increased to a level at which an exposure error is caused.

More specifically, in the embodiment shown in FIG. 7, when the intensity of light incident on the photoelectric transfer surfaces 2-1 to 2-n of the solid state image pickup element 105 is high, as shown in the timing chart shown in FIG. 9, the preset pulse φp and the clear pulse φc are the same as shown in FIG. 8. When the clear pulse φc goes to L level, the ripple carry counter 19 and the D-FF 20 are released from the cleared states, and the ripple carry counter 19 starts counting the frequency divided pulses. When the intensity of the incident light is high, the output V2 from the follower amplifier 11 reaches the reference voltage Vref2 before the time T1 as the allowable time for the exposure error given by the ripple carry output OUT1 of the ripple carry counter 19 elapses. Then, the output V3 from the comparator 12 goes to H level, and the load pulse is supplied form the $\overline{Q}$ output of the one-shot multivibrator 13 to the ripple carry counter 25. Since the time T1 has not elapsed, the ripple carry output OUT1 from the ripple carry counter 19 is at L level, and the count outputs Qa0 to Qd0 representing the charge stored time Ts are produced from the terminals a0 to d0. At this time, the Q output from the D-FF 20 remains at L level, and the NOR gates 21 to 24 invert the count outputs Qa0 to Qd0 and supply the inverted signals to the preset input terminals a1 to d1 of the ripple carry counter 25. Therefore, in response to the load pulse from the one-shot multivibrator 13 generated upon elapse of the charge stored time Ts, the ripple carry counter 25 fetches the preset value which is determined by the count of the ripple carry counter 19. The count at which the ripple carry counter 25 generates an output OUT2 is a count which is obtained by subtracting the preset value from the count value corresponding to the output OUT2 in a normal incident light intensity.

When the charge stored time in a high incident light intensity range is represented by Ts0, the allowable limit time for an exposure error is represented by T1 (constant), the time for enabling the transfer gate in a normal incident light intensity range is represented by Ts (constant) and the pulse width of the transfer gate clock pulse φTGW in a high incident light intensity range is represented by TTGW, we have:

Ts0/T1=TTGW/T2 and therefore

TTGW/Ts0=T2/T1=constant for Ts<T1. When the oscillator 16 and the frequency divider 17 are set such that T1=127μsec and T2=16μsec, for Ts<T1 for a high incident light intensity range, the exposure error for a desired photoelectric transfer output VOUT is given by:

VOUT ×(T2/T1)=VOUT×0.125 so that a photoelectric transfer output equivalent to that in a normal incident light intensity range is obtained. Thus, the dynamic range is further widened.

When the pulse width of the transfer gate clock pulse φTGW is decreased to control the photoelectric transfer output in a high incident light intensity range, the load of the output amplifier 9 and the like is decreased. That is, the range of the output amplifier 9 within which linearity between the charge and voltage is guaranteed can be narrow, e.g., 0 to VOUT×3 V. For this reason, only low voltage and low power are required as compared to the case wherein a saturation output is obtained.

In the embodiment shown in FIG. 7, when the charge stored time Ts determined in accordance with an incident light intensity becomes shorter than the predetermined time T1, the pulse width TTGW of the transfer gate clock pulse φTGW is decreased linearly and proportionally to the charge stored time Ts, thereby preventing an increase in the photoelectric transfer output by an exposure error. However, a considerable effect can be obtained if a substantially proportional relationship is guaranteed.

Figure 10:
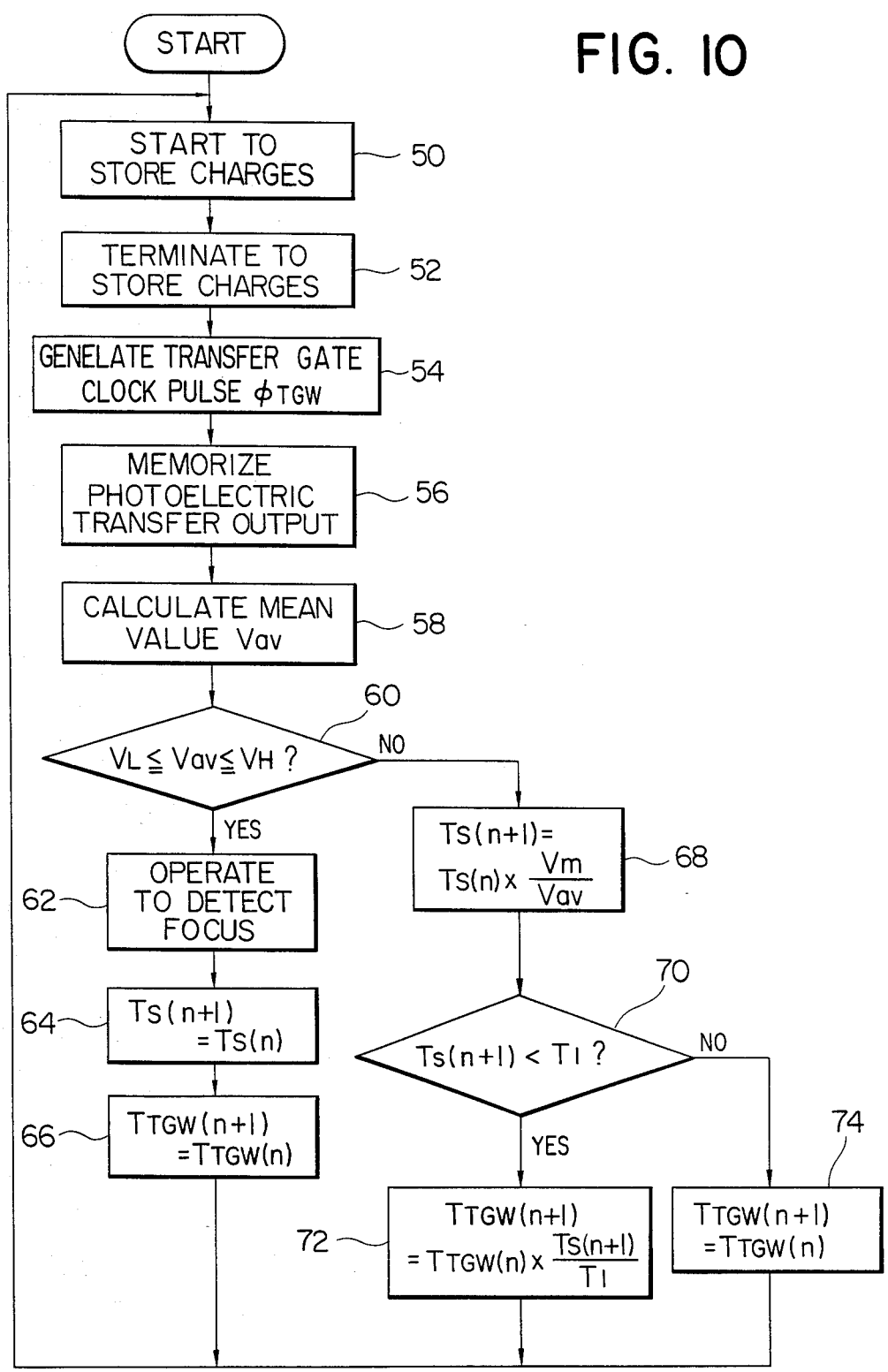

FIG. 10 is a timing chart in the case wherein the solid state image pickup element 106 and the detecting circuit 106 comprise hardware means as in the embodiment shown in FIG. 7, but the charge stored time setting circuit 107, the threshold time setting circuit 108, the comparator 109 and the pulse width control circuit 110 are replaced by a microcomputer.

Referring to FIG. 10, assuming that charge and swept of charges is performed n times, when the start pulse is supplied, charge storage is started in step 50. In step 52, the charge storage end pulse is generated after the previous charge stored time Ts(n). In step 54, the transfer gate clock pulse φTGW of the pulse width TTGW(n) set in the previous sequence is generated.

In step 56, the A/D converted photoelectric transfer output is stored. In step 58, in order to detect the indicent light intensity, a mean value Vav of the photoelectric transfer outputs is produced.

In step 60 it is checked if the mean value Vav calculated in step 58 is proper, i.e., if VL≦Vav≦VH is satisfied where VL is set at about 100 mV and VH is set at about 300 mV when the input range of the A/D converter is 512 mV.

When it is determined in step 60 that the mean value Vav of the photoelectric transfer outputs satisfies the relation VL≦Vav≦VH, it is determined that output data is proper. In step 62, the focus detection is performed. In step 62, the next charge stored time Ts(n+1) is set. At this time, since the mean value Vav of the photoelectric transfer outputs is proper, the next charge stored time Ts(n+1) is set to be the same as the current charge stored time Ts(n). In step 66, the pulse width TTGW(n+1) of the next transfer gate clock pulse φTGW(n+1) is set. In a similar manner to the case of the charge stored time, the pulse width is set such that TTGW(n+1)=TTGW(n).

However, if the photoelectric transfer output level is about to saturate or very low, that is, if the mean value does not satisfy the relation VL≦Vav≦VH and the charge stored time Ts(n) is improper, processing in step 68 is performed so as to set a proper charge stored time.

In step 68, the charge stored time Ts is reset. More specifically, the time Ts is calculated by:

$$Ts(n+1)=Ts(n)\times(Vm/Vav)$$

where Vm is a predetermined value for providing a desired photoelectric transfer output and is about 200 mV. It is then checked in step 70 if the charge stored time Ts reset in step 68 is shorter than the time T1 as the allowable limit time for an exposure error. That is, when the reset charge stored time Ts(n+1) is shorter than the time T1, the pulse width TTGW of the next transfer gate clock pulse φTTGW(n+1) is reset in order to reduce the adverse influence of an exposure error in step 72. The pulse width is reset by:

$$TTGW(n+1)=TTGW(n)\times(Ts(n+1)/T1).$$

However, when it is determined in step 70 that the reset charge stored time Ts(n+1) exceeds the time T1, the pulse width is set such that TTGW(n+1)=TTGW(n) in step 74.

The start pulse and the charge storage end pulse are generated by a timing pulse generator similar to that shown in FIG. 7 through an output port of the microcomputer. A preset pulse and a clear pulse are similarly supplied from the timing pulse generator to the solid state image pickup element. The charge stored time Ts and the pulse width TTGW of the transfer gate clock pulse φTGW are set by an internal timer and software of the microcomputer. An output port is provided for the timing generator to allow control of the stored time and the charge transfer of the solid state image pickup element.

When the charge stored time Ts is very short and it is difficult to set the time Ts, the time Ts is set to be equal to the time T1 so that the pulse width TTGW of the transfer gate clock pulse φTGW is extremely short in accordance with the characteristics shown in FIG. 3. Thus, a dexired photoelectric transfer output can be obtained.

In the embodiment, the comparator 109 directly compares the outputs from the charge stored time setting circuit 107 and the threshold time setting circuit 108. However, the present invention is not limited to this. For example, the apparatus may include a means (corresponding to 108) for setting a voltage corresponding to a maximum incident light intensity L1 which may not adversely affect a signal processing circuit, and a means (corresponding to 107) for outputting a mean value of the photoelectric transfer outputs. Then, outputs from both the means are compared by a comparator so as to indirectly compare the charge stored time and the threshold time. The pulse width control circuit 110 can be controlled in accordance with the comparison result from the comparator 110.

What is claimed is:

1. A solid state image pickup apparatus including:
   (a) photo array means having a plurality of photoelectric transfer elements which are one-dimensionally arrayed, said plurality of photoelectric transfer elements generating charges corresponding to incident light intensities, respectively;
   (b) means for storing the charges generated by said plurality of photoelectric transfer elements;
   (c) output means for outputting the charges stored by said storing means;
   (d) transfer means for transferring the charges stored by said storing means to said output means;
   (e) first detecting means for detecting the intensities of the light incident on said plurality of photoelectric transfer elements and for generating a first detection signal;
   (f) storage time control means for controlling a storage time of the charges by said storing means in accordance with the first detection signal;
   (g) second detecting means for detecting that the storage time of the charges of said storing means in accordance with said storage time control means is shorter than a predetermined period of time and for generating a second detection signal; and
   (h) transfer control means for controlling an operation time of said transfer means to fall within a preset period of time, said transfer control means controlling the operation time of said transfer means to be shorter than the preset period of time in accordance with the second detection signal.

2. An apparatus according to claim 1, wherein said transfer control means controls, in response to the second detection signal, said transfer means so that the operation time of said transfer means is proportional to the storage time of said storing means.

3. A solid state image pickup apparatus including:
   (a) photo array means, having a plurality of photoelectric transfer elements which are one-dimensionally arrayed, for storing charges generated from said plurality of photoelectric transfer elements, said plurality of photoelectric transfer elements generating charges corresponding to intensities of light incident thereon;
   (b) output means for outputting the charges stored by said photo array means;
   (c) transfer means for transferring the charges stored in said photo array means to said output means;
   (d) first detecting means for detecting the intensities of incident light and for detecting a first detection signal;
   (e) stored time control means for controlling a storage time of the charges by said photo array means in accordance with the first detection signal;
   (f) second detecting means for detecting that the storage time of the charges by said photo array means in accordance with said storage time control means and for generating a second detection signal; and
   (g) transfer control means for controlling an operation time of said transfer means in accordance with the second detection signal.

4. An apparatus according to claim 3, wherein
   the second detection signal indicates the detected storage time; and
   said transfer control means fixes, in response to the second detection signal, the operation time of said transfer means to a predetermined period of time when the detected storage time is longer than the predetermined period of time and controls the operation time of said transfer means to be shorter than the predetermined period of time when the detected storage time is shorter than the predetermined period of time.

5. An apparatus according to claim 4, wherein said transfer control means controls said transfer means so that the operation time of said transfer means is proportional to the storage time of said storing means when the detected stored time is shorter than the predetermined period of time.

6. An apparatus according to claim 3, wherein said first detecting means detects a substantially means value of the intensities of light incident on said plurality of photoelectric transfer elements.

7. An apparatus according to claim 3, wherein
said photo array means includes a plurality of storing means, arranged along said plurality of photoelectric transfer elements, for storing the charges generated by said plurality of photoelectric transfer elements;
said transfer means has a transfer gate arranged along said plurality of storing means; and
said transfer control means applies a voltage to said transfer gate so as to operate said transfer means.

8. A solid state image pickup apparatus including:

(a) photo array means, having a plurality of photoelectric transfer elements which are one-dimensionally arrayed, for storing charges generated by said plurality of photoelectric transfer elements, said plurality of photoelectric transfer elements generating charges corresponding to intensities of light incident thereon;

(b) output means for outputting the charges stored by said photo array means;

(c) transfer means for transferring the charges stored by said photo array means to said output means;

(d) detecting means for detecting data changing in accordance with the intensities of light incident and for generating a detection signal; and (e) control means for controlling an operation time of said transfer means in accordance with the detection signal.

9. An apparatus according to claim 8, wherein said detection signal indicates a substantially mean value of the intensities of light incident on said plurality of photoelectric transfer elements.

10. An apparatus according to claim 9, wherein said control means shortens the operation time of said transfer means in accordance with an increase in the intensities of light incident indicated by the detection signal.

* * * * *